3,781,308
PREPARATION OF 5-BENZYL-3-
FURYLMETHANOL
John B. Siddall, Palo Alto, Calif., assignor to
Zoecon Corporation, Palo Alto, Calif.
No Drawing. Filed July 3, 1972, Ser. No. 268,306
Int. Cl. C07d 5/20, 5/26
U.S. Cl. 260—347.8                     2 Claims

ABSTRACT OF THE DISCLOSURE

Thermal condensation of 5-benzylfuran with an alkyl propiolate to form an intermediate bicyclic compound which, by reverse reaction and subsequent reduction of the ester group, yields 5-benzyl-3-furylmethanol, useful as intermediate in the manufacture of pyrethroid insecticides.

---

The present invention relates to a novel process for the preparation of 5-benzyl-3-furylmethanol. Certain chrysanthemic acid esters of this alcohol are known to be among the most active insecticides of the synthetic pyrethrin type. This invention provides a simple two-step synthesis for the furan-substituted methanol which can be outlined as follows:

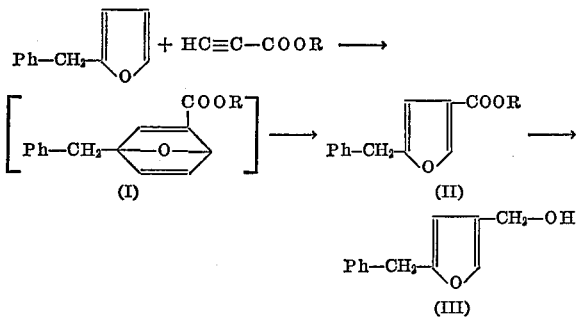

In the above formulas, Ph is phenyl and R is lower alkyl.

The starting materials, benzylfuran and propiolic acid esters, are readily and commercially available. In the first step of the synthesis, 5-benzylfuran is condensed with a lower alkyl propiolate such as methyl propiolate, ethyl propiolate or propyl propiolate, under conditions of the Diels-Alder reaction, to give the bicyclic intermediate (I) which need not be isolated unless desired and which, by a retro-Diels-Alder process (Alder Rickert reaction) in situ affords the ester of Formula II. The processes described are carried out in autoclaves or sealed vessels, above the temperatures at which the acetylenic esters normally (760 mm.) boil, usually from about 150° C. to about 300° C. High boiling point solvents of hydrocarbon or dipolar ether types may be used if desired but the reaction occurs without solvents. Lewis acid type catalysts, such as copper tetrafluoroborate or similar, and free-radical inhibitors such as hydroquinone or esimilar—to inhibit polymerization—can also be added if desired. The reaction affords predominantly the 3,5-disubstituted furan with a small amount of the 4,5-disubstituted furan also present. The products are separated by chromatography or by fractional distillation of the reaction mixture, preferably in two stages: Rapid flash distillation under high vacuum followed by a careful fractional vacuum distillation.

In the second step of the synthesis, the 5-benzyl-3-furan ester (II) is reduced with lithium aluminum hydride or the like, in an ether solvent, in the conventional way, to yield the desired 5-benzyl-3-furylmethanol (III).

The importance and use of this alcohol in the preparation of potent pyrethroid insecticides, which are very toxic to insects and possess very low mammalian toxicity, has been amply described by Elliott M., et al., Nature 213,493 (1967). See also U.S. Pats. 3,465,007; 3,466,304; 3,542,928 and 3,510,558.

The term "lower alkyl," as used herein, refers to a straight or branched chain saturated aliphatic hydrocarbon group having a chain length of one to six carbon atoms, e.g., methyl, ethyl, propyl, i-propyl, n-butyl, s-butyl, t-butyl, pentyl and hexyl.

The following example is given to illustrate the practice of the present invention. Temperatures are given in degrees centigrade.

EXAMPLE (A) Equimolar amounts of 5-benzylfuran and methyl propiolate are heated in a sealed tube at 200°–225° for 20 hours. The crude reaction product is chromatographed on silica gel preparative plates eluting with 15% ethyl acetate in hexane to obtain methyl 5-benzyl-3-furoate as the major and more polar isomer.

(B) Methyl 5-benzyl-3-furoate (1.1 g.) in 50 ml. of dry ether is added to a mixture of lithium aluminum hydride (2 g., 100% excess) in 100 ml. of dry ether with stirring at room temperature. After about 8 hours the product is decomposed with water, the ethereal layer separated and washed with brine, dried with calcium sulfate and evaporated to yield 5-benzyl-3-furylmethanol.

What is claimed is:
1. A process for the preparation of the compound of Formula III, 5-benzyl-3-furylmethanol:

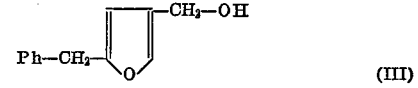

wherein Ph is phenyl, which comprises the thermal condensation of 5-benzyl-furan with a lower alkyl propiolate, in a sealed vessel and at temperatures from about 150° C. to about 300° C. to give a lower alkyl 5-benzyl-3-furoate of Formula II via the bicyclic intermediate of Formula I

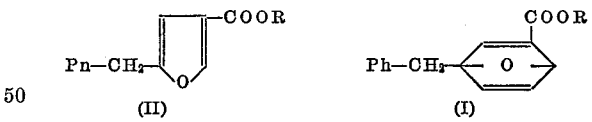

wherein Ph is phenyl and R is lower alkyl, followed by reduction of the carboxylic group in (II) to yield the hydroxy-methyl compound of Formula III.

2. The process according to claim 1 wherein R is methyl or ethyl and the temperature is 200°–250° C.

References Cited
Tanaka et al., Chem. Abstr. (1971), vol. 75, 35700d.

ALTON D. ROLLINS, Primary Examiner
B. DENTZ, Assistant Examiner

U.S. Cl. X.R.
260—347.5